May 29, 1945.   D. KASEN   2,377,239
SET-UP AND ADJUSTMENT MEANS
Filed March 27, 1944   2 Sheets-Sheet 2
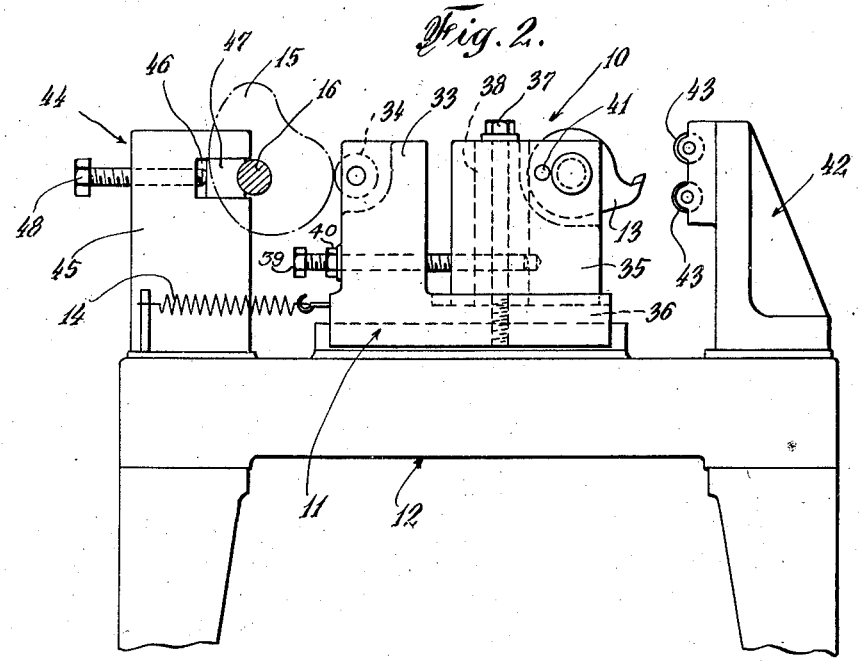
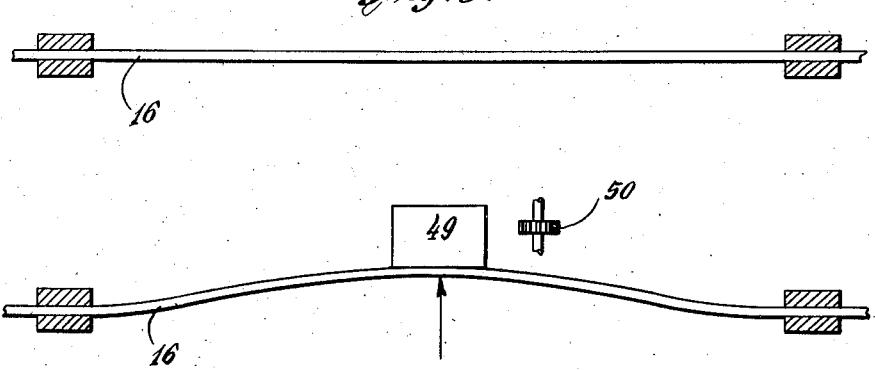
INVENTOR.
Daniel Kasen
BY
ATTORNE.

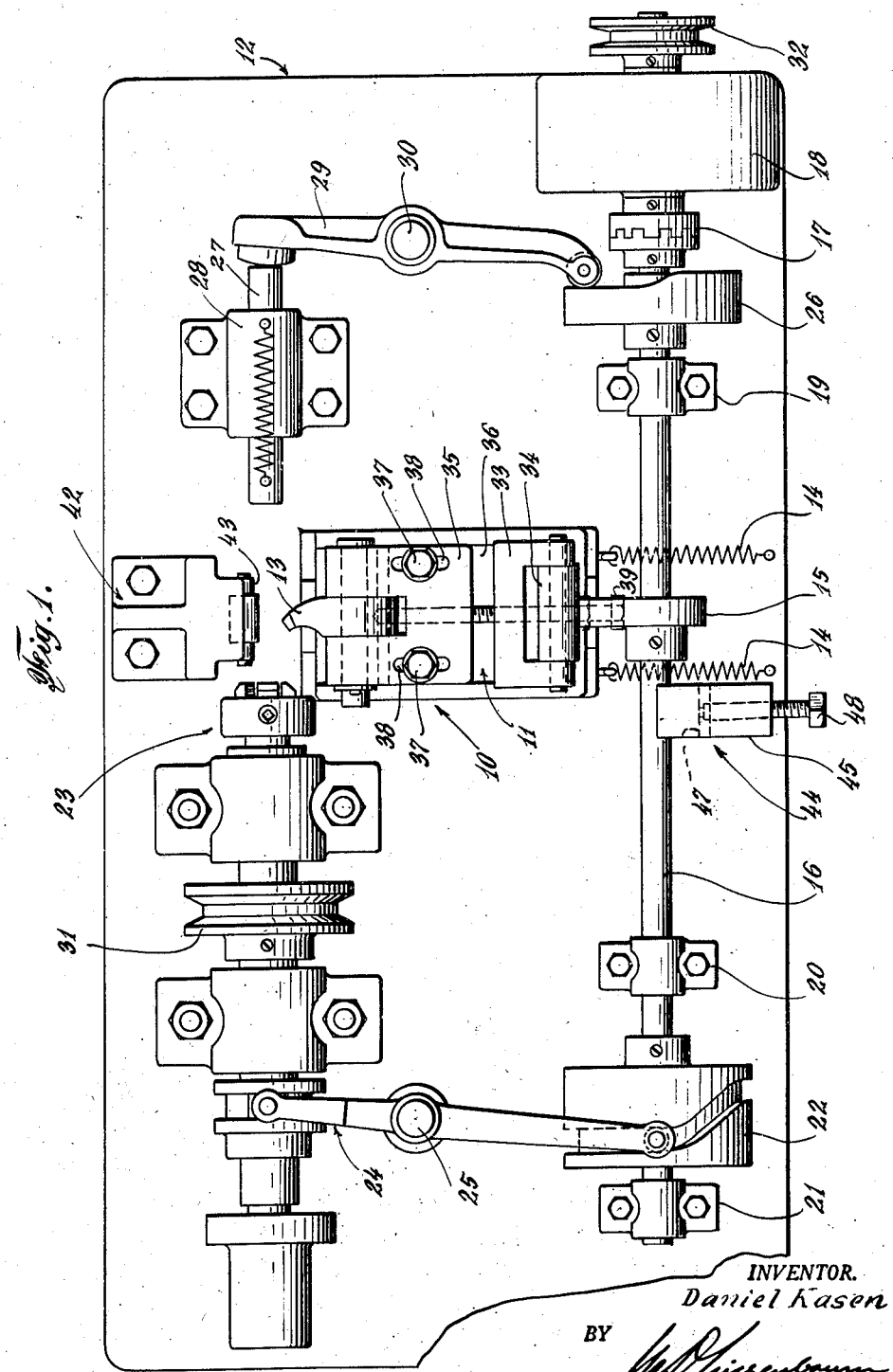

Patented May 29, 1945

2,377,239

UNITED STATES PATENT OFFICE 2,377,239

SETUP AND ADJUSTMENT MEANS

Daniel Kasen, Newark, N. J., assignor of one-half to Harold K. Baron, Brooklyn, N. Y.

Application March 27, 1944, Serial No. 528,207

3 Claims. (Cl. 82—19)

This invention relates to machine tools and more particularly to means for adjusting the relative position of co-operative components thereof.

An object of this invention is to provide a means of novel and improved construction particularly adaptable to facilitate the set-up of automatic screw machines, other machines and machine tools.

A further object hereof is to provide a novel and improved means which will enable fine adjustment of machine tool components necessitated by wear in the cutting tools.

Another object of this invention is to provide a novel and improved means of the character mentioned, which will enable easy alteration of cam performance without change in cam structure.

A further object is to provide a novel and improved means of the type described whereby co-operating machine elements may be adjusted to maintain uniform required performance in the work accomplished.

Still a further object is to provide a novel and improved means of the nature set forth, which is simple in construction, easy to operate, adaptable for manipulation by lesser skilled operators than was heretofore necessary to accomplish adjustments on an automatic screw machine, for example, and efficient in carrying out the purposes and functions for which it is designed.

Other objects will become manifest as this disclosure proceeds.

In the accompanying drawings forming part of this application, similar characters of reference indicate corresponding parts in all the views.

Fig. 1 is a diagrammatic plan view of a machine embodying the teachings of this invention as may be employed in a single spindle automatic screw machine which I have chosen for the purpose of explaining the present invention.

Fig. 2 is a fragmentary section taken along lines 2—2 in Fig. 1, omitting various parts for the sake of clarity of illustration to facilitate description.

Fig. 3 and Fig. 4 are diagrammatic views to explain the principle of operation of this invention.

In the drawings, the numeral 10 indicates generally a tool post which is slidably mounted on a member 11 secured to the frame 12. Said tool post 10, carrying a cutting tool 13, is maintained by means of the springs 14, in contact with a cam 15, which actuates and normally determines tool movement. A cam shaft 16, coupled at 17 to a reduction gear indicated by 18, carries said cam 15 intermediate the appreciably spaced bearings or pillow blocks 19 and 20. Said cam shaft 16, between bearings 20 and 21 carries a cam 22 for control of the operation of the stock feeding means and chuck indicated generally by the numeral 23, the operation of which requires the fork lever 24 which is pivoted at 25 to the machine frame 12. Between the pillow block 19 and the coupling 17, the cam shaft 16 also carries a cam 26, which is adapted to control the movement of the tail slide 27, through the tail stock 28, by the employment of a lever 29 pivotally mounted at 30 to the frame 12. The pulley 31 of the head of the machine, and the pulley 32 carried on the cam shaft 16, may be driven from a power shaft or by individual motors.

The tool post 10 is comprised essentially of a support 33 for the cam roller 34 which is the follower of cam 15, and a support 35 on which the cutting tool 13 is mounted; member 35 being slidably mounted on the platform 36 of member 33, to which it is secured by means of the bolts 37 through slots 38, after initial adjustment has been effected by means of screw 39. The numeral 40 is a lock nut, and 41 designates a lock pin for the cutting tool 13. The numeral 42 is an ordinary work support provided with rollers 43, to obviate deflection of the stock by the cutting tool 13.

The cams 15, 22 and 26, are designed to perform their respective functions in a predetermined timed relation and to accomplish a scope of movement of the devices they control as is necessary to perform the required work, and ordinarily it has been usual hereto to set cutting tool position entirely by means of an adjustment screw or its equivalent.

For a very fine adjustment of cutter position as is required in performing work with close tolerances, or to compensate for cutter wear, in the embodiment shown, I employ a device designated generally by the numeral 44, with which cam shaft 16 is deflected toward the line of the work. This manipulation can be effected even while the machine is in operation. The scope of permissible deflection of said cam shaft 16 will depend upon the distance between the bearings 19 and 20 primarily, that is, without affecting its rotatability.

The shaft deflecting means 44, may comprise a fixed standard 45, having a slot 46, in which is horizontally slidably mounted a member 47 presenting a concave surface for bearing contact with the cam shaft 16. An adjustment screw 48, is provided to shift the bearing block 47 as may be required.

So, to shift the tool position with respect to the work for fine adjustment, the tool post set up is left intact, but the cam shaft 16, from an initial position as in Fig. 3, is deflected towards the work as is shown diagrammatically in exaggerated fashion in Fig. 4, by manipulation of the adjustment screw 48, whereby the scope of movement of the tool is not changed, but its path is advanced either for initial set up requirements, or to take up cutter wear during operation. This is accomplished as explained by advancing the axis of rotation of the cam shaft 16. This system may also be used anywhere it is required to alter cam performance where the scope of movement of the cam follower remains constant, but the limit positions of such co-operating follower are changed.

It is evident that initial set up for doing any required work, approximate adjustments are effected in the tool post assembly by shifting member 36 on the frame 12, and then by means of the adjustments screw 39. The precise adjustment is then accomplished by means of the device 44.

As further example, the teachings of this invention may be applied in machine and tool construction where a deflectable member, as indicated in Figs. 3 and 4, may be used to properly set and adjust the position of a jig holding work 49, with respect to a milling cutter 50, for instance, or a drill spindle carrying appropriate tools (not shown), to facilitate set-up for high precision machining and to adjust to proper position relation, as the cutter wears.

This invention is capable of numerous forms and various adaptations and applications, without departing from the essential features herein disclosed and taught. It is therefore intended and desired that the particular embodiment herein shown be deemed illustrative and not restrictive and that patent shall cover all patentable novelty herein disclosed; reference being had to the following claims, rather than to the specific matter herein described, to indicate the scope of this invention.

I claim:

1. In a machine, the combination with a frame, of a shaft rotatably mounted thereon, carrying a cam, a cam follower moveably mounted on the frame, in co-operating relation with the cam, and means to deflect said shaft toward the cam follower in the region of the cam, whereby the limits of movement of the cam follower are altered and the extent of movement of the cam follower remains unchanged.

2. In a machine, the combination with a frame, of a work holder and a cutting tool adapted to operate on the work, a shaft rotatably mounted on the frame, carrying a cam for controlling the relative position of the work-holder and the cutting tool between predetermined limits; said shaft being capable of being deflected, and means to deflect said shaft in the region of the cam, whereby said limits are altered.

3. In a machine, the combination with a frame, of a moveably mounted work holder, a slidably mounted cutting tool holder carrying a cam follower, a shaft rotatably mounted on the frame, carrying a cam which co-operates with the cam follower to alter the relative position of the work and tool holders and means to deflect the shaft in the region of the cam, whereby the limits of movement of the tool holder with respect to the work holder are altered.

DANIEL KASEN.